United States Patent
Mosher et al.

(10) Patent No.: US 9,959,468 B2
(45) Date of Patent: May 1, 2018

(54) SYSTEMS AND METHODS FOR OBJECT TRACKING AND CLASSIFICATION

(71) Applicant: THE BOEING COMPANY, Huntington Beach, CA (US)

(72) Inventors: Aaron Y. Mosher, Madison, AL (US); David Keith Mefford, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 14/934,773

(22) Filed: Nov. 6, 2015

(65) Prior Publication Data
US 2017/0132468 A1    May 11, 2017

(51) Int. Cl.
G06K 9/00 (2006.01)
G06T 7/20 (2017.01)
G06K 9/62 (2006.01)

(52) U.S. Cl.
CPC ..... *G06K 9/00718* (2013.01); *G06K 9/00744* (2013.01); *G06K 9/00765* (2013.01); *G06K 9/6269* (2013.01); *G06T 7/2033* (2013.01)

(58) Field of Classification Search
None
See application file for complete search history.

(56) References Cited

U.S. PATENT DOCUMENTS

| | | | | |
|---|---|---|---|---|
| 5,912,980 A * | 6/1999 | Hunke | ............... | G06K 9/00228 348/169 |
| 6,801,662 B1 * | 10/2004 | Owechko | ........... | G06K 9/00201 382/103 |
| 7,227,893 B1 * | 6/2007 | Srinivasa | ........... | G06K 9/00771 348/155 |
| 8,224,029 B2 * | 7/2012 | Saptharishi | ........ | G06K 9/00771 382/103 |
| 9,367,733 B2 * | 6/2016 | Zhu | ..................... | G06K 9/00362 |
| 9,437,009 B2 * | 9/2016 | Medioni | ................... | G06T 7/20 |
| 2003/0095140 A1 * | 5/2003 | Keaton | ................... | G06F 3/011 715/700 |
| 2005/0073585 A1 * | 4/2005 | Ettinger | ................... | H04N 7/18 348/155 |
| 2007/0154100 A1 * | 7/2007 | Au | ....................... | G06K 9/4652 382/226 |
| 2010/0054535 A1 * | 3/2010 | Brown | ............... | G06K 9/00369 382/103 |
| 2011/0221974 A1 * | 9/2011 | Stern | ....................... | G06F 3/017 348/734 |
| 2011/0301447 A1 * | 12/2011 | Park | ..................... | G06T 7/0016 600/407 |
| 2012/0026332 A1 * | 2/2012 | Hammarstrom | ........ | G06T 7/593 348/148 |
| 2013/0034266 A1 * | 2/2013 | Shamir | ................ | G06K 9/6293 382/103 |
| 2013/0169822 A1 * | 7/2013 | Zhu | ......................... | G06T 7/0018 348/180 |
| 2013/0170696 A1 * | 7/2013 | Zhu | ........................ | G06K 9/68 382/103 |
| 2015/0071489 A1 | 3/2015 | Weismuller et al. | | |
| 2015/0103184 A1 * | 4/2015 | Tracey | .................. | G01S 3/7865 348/169 |
| 2015/0117760 A1 * | 4/2015 | Wang | ................... | G06K 9/4628 382/157 |
| 2016/0171852 A1 * | 6/2016 | Lin | .................. | G08B 13/19608 382/103 |
| 2016/0179844 A1 * | 6/2016 | Shen | ................. | G06F 17/30247 382/156 |
| 2016/0292510 A1 * | 10/2016 | Han | .................... | G06K 9/00724 |

OTHER PUBLICATIONS

Get Ready for the Low-Power Image Recognition Challenge with Jetson TK1, http://devblogs.nvidia.com/parallelforall/low-power-image-recognition-challenge-jets/, © 2015 NVIDIA Corporation, 4 pages.
Krizhevsky, A. et al., ImageNet Classification with Deep Convolutional Neural Networks, Neural Information Processing Systems, NIPS 2012, 9 pages.
McCann, S. et al., Object Detection using Convolutional Neural Networks, http://cs229.stanford.edu/proj2013/ReesmanMcCann-Vehicle-Detection.pdf, retrieved from Internet Nov. 9, 2015, 5 pages.
Russakovsky, O. et al., ImageNet Large Scale Visual Recognition Challenge, IJCV 2015, 43 pages.
http://www.sentientvision.com, © 1999-2004 Sentient Pty Ltd., 1 page.
http://www.image-net.org/challenges/LSVRC/2014/; © 2014 Stanford Vision Lab, 5 pages.
Szegedy, C. et al., Deep Neural Networks for Object Detection, http://static.googleusercontent.com/media/research.google.com/en/us/pubs/archive/41457.pdf, retrieved from Internet Nov. 6, 2015, 9 pages.
Wang, X., Deep Learning in Object Detection, Segmentation, and Recognition, http://mmlab.ie.cuhk.edu.hk/resources/deep_learning/overview.pdf, retrieved from Internet Nov. 6, 2015, 64 pages.
Yang, X. et al., MDig: Multi-digit Recognition using Convolutional Neural Network on Mobile, http://stanford.edu/class/cs231m/projects/final-report-yang-pu.pdf, retrieved from Internet Nov. 6, 2015, 10 pages.

(Continued)

*Primary Examiner* — Shervin Nakhjavan
(74) *Attorney, Agent, or Firm* — Coats & Bennett, PLLC

(57) ABSTRACT

A method for classifying at least one object of interest in a video is provided. The method includes accessing, using at least one processing device, a frame of the video, the frame including at least one object of interest to be classified, performing, using the at least one processing device, object detection on the frame to detect the object of interest, tracking, using the at least one processing device, the object of interest over a plurality of frames in the video over time using a persistent tracking capability, isolating, using the at least one processing device, a segment of the frame that includes the object of interest, classifying, using the at least one processing device, the object of interest by processing the segment using deep learning, and generating an output that indicates the classification of the object of interest.

21 Claims, 5 Drawing Sheets

(56) References Cited

OTHER PUBLICATIONS

Schulz, H. et al., Object-Class Segmentation using Deep Convolutional Neural Networks, DAGM Workshop on New Challenges in Neural Computation, Frankfurt, Aug. 2011, 4 pages.

Karpathy, A. et al., Large-Scale Video Classification with Convolutional Neural Networks, http://www.cs.cmu.edu/~rahuls/pub/cvpr2014-deepvideo-rahuls.pdf, retrieved from Internet Nov. 6, 2015, 8 pages.

Wu, Z. et al., Robust Video Segment Proposals with Painless Occlusion Handling, http://www.cv-foundation.org/openaccess/content_cvpr_2015/papers/Wu_Robust_Video_Segment_2015_CVPR_paper.pdf, retrieved from Internet Nov. 6, 2015, pp. 4194-4203.

Erhan, D. et al., Scalable Object Detection using Deep Neural Networks, http://www.cv-foundation.org/openaccess/content_cvpr_2014/papers/Erhan_Scalable_Object_Detection_2014_CVPR_paper.pdf, retrieved from Internet Nov. 6, 2015, 8 pages.

* cited by examiner

SYSTEMS AND METHODS FOR OBJECT TRACKING AND CLASSIFICATION

BACKGROUND

The field of the disclosure relates generally to visual analysis of objects, and, more particularly, to tracking and classifying objects of interest in a video.

Existing systems for visual detection of objects are generally based on some sort of distinctive characteristic of an object as compared to a disregarded background. The distinctive characteristics may be color, spatial, or movement characteristics compared to the background. Such systems may be somewhat robust at object detection, but require a human operator to classify (i.e., identify) the object. Further, although at least some known systems are able to classify objects, such systems may only be able to classify an entire image as one object, instead of segmenting the image into discrete objects. Moreover, at least some known systems iteratively search an entire image in smaller sub-sections to classify discrete objects, which requires significant computational time and resources.

BRIEF DESCRIPTION

In one aspect, a method for classifying at least one object of interest in a video is provided. The method includes accessing, using at least one processing device, a frame of the video, the frame including at least one object of interest to be classified, performing, using the at least one processing device, object detection on the frame to detect the object of interest, tracking, using the at least one processing device, the object of interest over a plurality of frames in the video over time using a persistent tracking capability, isolating, using the at least one processing device, a segment of the frame that includes the object of interest, classifying, using the at least one processing device, the object of interest by processing the segment using deep learning, and generating an output that indicates the classification of the object of interest.

In another aspect, a computer-implemented system for classifying at least one object of interest in a video is provided. The system includes a tracking component implemented using at least one processing device and configured to access a frame of the video, the frame including at least one object of interest to be classified, perform object detection on the frame to detect the object of interest, track the object of interest over a plurality of frames in the video over time using a persistent tracking capability, and isolate a segment of the frame that includes the object of interest. The system further includes a classification component communicatively coupled to the tracking component, the classification component implemented using the at least one processing device and configured to classify the object of interest by processing the segment using deep learning, and generate an output that indicates the classification of the object of interest.

In yet another aspect, an object classification computing device for classifying at least one object of interest in a video is provided. The object classification computing device includes a memory device, and a processor communicatively coupled to the memory device, the processor configured to access a frame of the video, the frame including at least one object of interest to be classified, perform object detection on the frame to detect the object of interest, track the object of interest over a plurality of frames in the video over time using a persistent tracking capability, isolate a segment of the frame that includes the object of interest, classify the object of interest by processing the segment using deep learning, and generate an output that indicates the classification of the object of interest.

DETAILED DESCRIPTION

The implementations described herein facilitate detecting, tracking, and classifying objects of interest in a video. From a frame of video, a tracking component detects and tracks one or more objects of interest. Segments containing the objects of interest are transmitted to a classification component. The classification component uses deep learning to classify (i.e., identify) the object of interest. By classifying the object based on only a segment of the frame, the computational requirements needed to classify the object are significantly reduced.

Figure 1:
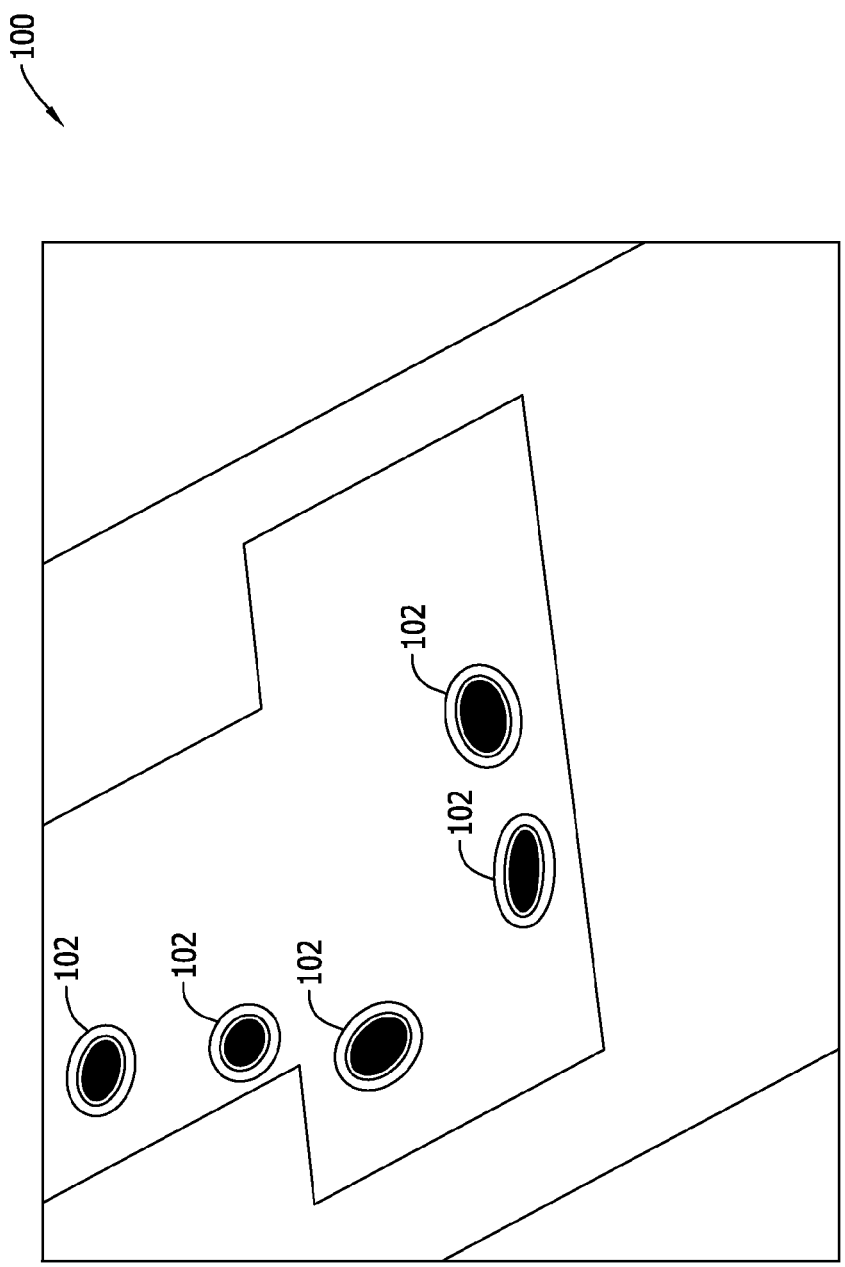
FIG. 1 is an exemplary frame of a video.

FIG. 1 is an exemplary frame 100 of a video. Frame 100 includes a plurality of objects of interest 102. In the exemplary implementation, objects of interest 102 are vehicles on a runway. As will be appreciated by those of skill in the art, objects of interest 102 may be any suitable type of object in any suitable environment. For example, objects of interest 102 may be people, buildings, animals, devices, etc., and environments could include terrain, water, sky, etc. For clarity, each object of interest 102 is circled in frame 100.

Figure 2:
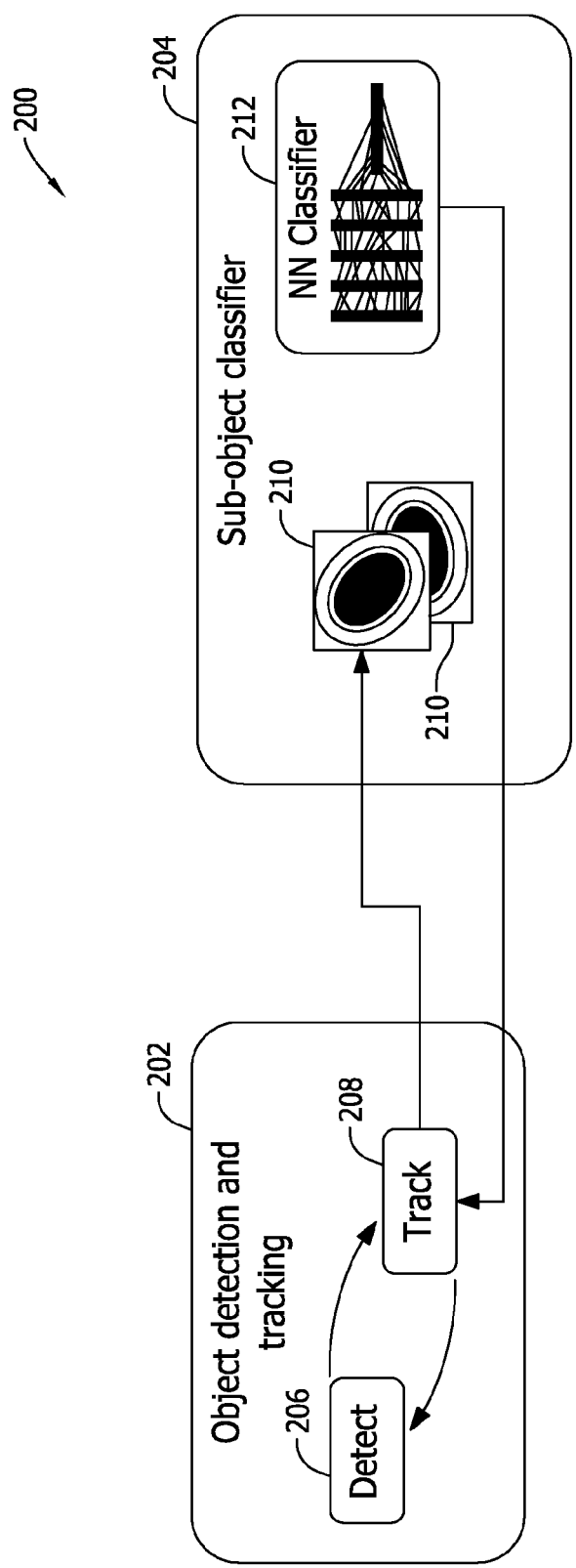
FIG. 2 is a schematic diagram of an exemplary system for tracking and classifying objects of interest in video footage.

FIG. 2 is a schematic diagram of an exemplary system 200 for tracking and classifying objects of interest in video footage. For example, system 200 may be used to track and classify objects of interest 102 in a video that includes frame 100. In the exemplary implementation, system 200 includes a tracking component 202 and a classification component 204. Tracking component 202 and classification component 204 may be implemented using the same computing device, or may be implemented on separate computing devices that are communicatively coupled to one another. In some implementations, tracking component 202 and/or classification component 204 are implemented using a general purpose graphics processing unit (GPGPU).

In the exemplary implementation, tracking component 202 processes each frame of video footage provided to tracking component 202. Specifically, for a given frame, at block 206, tracking component 202 detects one or more objects of interest in the frame. Objects of interest may be detected using any suitable technique. For example, in some implementations, objects of interest in a given frame are detected based on previous and subsequent frames. Each detected object of interest is noted (e.g., tagged) by tracking component 202 and tracked persistently through subsequent frames at block 208. Tracking component 202 may detect and track objects using, for example, optical flow and Kalman filtering.

Tracking component 202 is able to detect and track an object of interest, but, in the exemplary implantation, is not capable of recognizing what the object is. That is, tracking component 202 does not classify detected objects of interest. Accordingly, in the exemplary implementation, when objects are first detected, they are identified as "unknown" objects prior to classification.

As shown in FIG. 2, each new object of interest detected using tracking component 202 is transmitted to classification component 204. Specifically, a segment 210 of the frame that includes the object of interest is transmitted to classification component 204. Notably, classification component 204 only receives segments 210 in the exemplary implementation, and does not receive the entire frame. This significantly reduces the computational resources required to classify the detected objects. Further, classification component 204 may be trained to classify objects based on the assumption that the object is located in the center of the provided image. By providing classification component 204 with segments 210 in which the object is already centered, classification component 204 is able to better classify the object, than if object were located off-center in a larger image (e.g., the entire frame).

In the exemplary implementation, classification component 204 classifies the object from segment 210 using a neural network, or deep learning classifier 212. As used herein, a deep learning system refers to a form of machine learning that utilizes multiple interconnected neural network layers along with feedback mechanisms or other methods to improve the performance of the underlying neural network. Deep Learning systems are a modern incarnation of neural network systems; usually based on several interconnected layers of a convolution neural network, among other layers, interconnections, or feedback mechanisms. Further "deep learning" may be used to refer to any system utilizing a combination of neural networks, interconnected layers, supervised or machine learning. Deep Learning system can be used for a variety of purpose such as computational intelligence and processing voice commands, although in the present disclosure they are used for image recognition.

From a computation standpoint, the methods used in deep learning involve several mathematical calculations of matrix-to-matrix and matrix-to-vector calculations. The number and nature of these calculations makes them essentially impossible for a human to perform the calculation by-hand or by manual process, within any practical amount of time. Deep learning as used herein refers to a system or algorithm of computer software and hardware that calculates an input image response across the various layers within the deep learning system, resulting in an output that is an indication of most likely identification from amongst the possible categories. As discussed herein, the embodiments described herein use detection and tracking to reduce the computational effort necessary for subsequent identification, compared to at least some known methods which perform image analysis methods on an entire scene.

Deep learning classifier 212 may be, for example, a convolutional neural network (CNN), a deep neural network (DNN), or any other type of deep learning system that enables classification component 204 to function as described herein. In the exemplary implementation, only new objects detected by tracking component 202 are classified by classification component 204, further reducing the computation resources required by system 200.

Segments 210 are fed to deep learning classifier 212 one at a time to be recognized, in the exemplary implementation. Accordingly, if multiple segments 210 (i.e., for multiple objects) are sent to classification component 204 substantially simultaneously, classification of at least some segments 210 may be delayed. Further classification of detected objects may be delayed based on the strength (e.g., bandwidth, latency, etc.) of the communications link between tracking component 202 and classification component 204. Such delay, however, does not impede continued tracking of the object by tracking component 202.

Once an object is classified, the classification (i.e., the recognized category) for that object is transmitted to tracking component 202. This allows tracking component 202 to associate the classification with the previous "unknown" object. Accordingly, if an identified object leaves the field of view of the video, and later re-enters, system 200 determines that it is the same object that was seen before. This allows for persistent tracking of objects even if the objects leave a field of view of the video temporarily.

Transmitting only segments 210 to classification component 204 provides a number of advantages. For example, because of the relatively small data transfer associated with segments 210, classification component 204 may be communicatively coupled to tracking component 202 over a low bandwidth, high latency connection in some implementations. Further, this enables classification component 204 to have relatively small size, weight, and power (SWAP) requirements. Accordingly, in some implementations, tracking component 202 and/or classification component 204 may be located onboard a vehicle (e.g., an unmanned aerial vehicle (UAV). In such implementations, the video analyzed by system 200 may be acquired using a camera or other optical receiver included on the vehicle.

In the exemplary implementation, system 200 generates one or more real-world outputs for a user. For example, upon classifying an object, system 200 may identify the object to the user using suitable audio/visual techniques. Further, in some implementations, a user may be looking for a particular object (e.g., a blue truck). Using a user input device, user may instruct system 200 to generate an audio and/or visual alert when the particular object is identified. In some embodiments, an alert is generated only when the desired object is identified, and no alert is generated when other objects are identified. Alternatively, an alert may be generated when any object is identified. In some embodiments, the alert includes generating a bounding box or other visual indicia that is overlaid on a display of the original frame (e.g., displayed on a display device), the bounding box or other visual indicia demarcating that location of the object within the frame.

Figure 3:
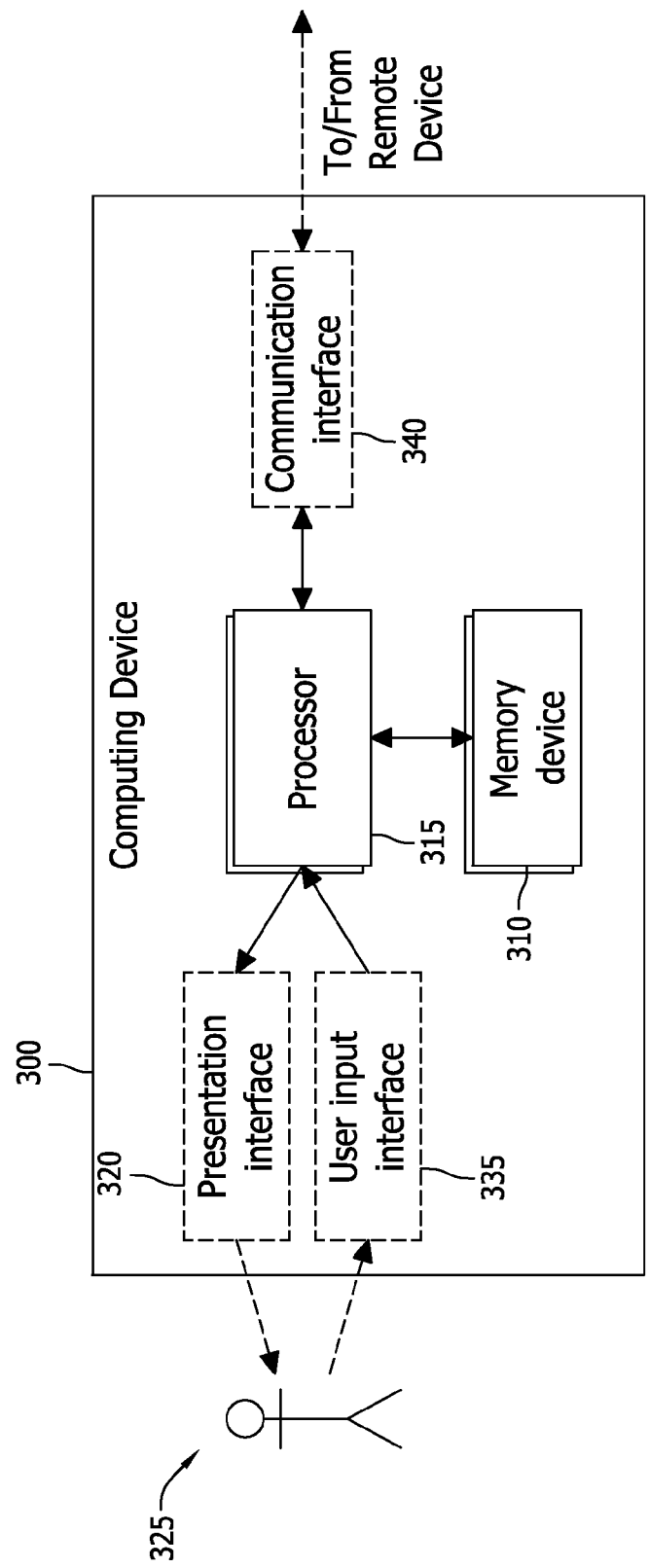
FIG. 3 is a block diagram of an exemplary object classification computing device that may be used to implement the system shown in FIG. 2.

FIG. 3 is a block diagram of an object classification computing device 300 that may be used to implement system 200 (shown in FIG. 2). For example, tracking component 202 and/or classification component 204 may be implemented using object classification computing device 300. Object classification computing device 300 includes at least one memory device 310 and a processor 315 that is coupled to memory device 310 for executing instructions. In some implementations, executable instructions are stored in memory device 310. In the exemplary implementation, object classification computing device 300 is a specialized computing device that performs one or more operations described herein by programming processor 315. For example, processor 315 may be programmed by encoding an operation as one or more executable instructions and by providing the executable instructions in memory device 310.

Processor 315 may include one or more processing units (e.g., in a multi-core configuration). Further, processor 315 may be implemented using one or more heterogeneous processor systems in which a main processor is present with secondary processors on a single chip. In another illustrative example, processor 315 may be a symmetric multi-processor system containing multiple processors of the same type. Further, processor 315 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), general purpose graphics processing unit (GPU), and any other circuit capable of executing the functions described herein.

In the exemplary implementation, memory device 310 is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, application source code, application object code, source code portions of interest, object code portions of interest, configuration data, execution events and/or any other type of data.

In the exemplary implementation, object classification computing device 300 includes a presentation interface 320 that is coupled to processor 315. Presentation interface 320 presents information to a user 325. For example, presentation interface 320 may include a display adapter (not shown) that may be coupled to a display device, such as a cathode ray tube (CRT), a liquid crystal display (LCD), an organic LED (OLED) display, and/or an "electronic ink" display. In some implementations, presentation interface 320 includes one or more display devices. Further, in some implementation, presentation interface may not generate visual content, but may be limited to generating audible and/or computer-generated spoken-word content.

In the exemplary implementation, object classification computing device 300 includes a user input interface 335. User input interface 335 is coupled to processor 315 and receives input from user 325. User input interface 335 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 320 and user input interface 335.

Object classification computing device 300, in the exemplary implementation, includes a communication interface 340 coupled to processor 315. Communication interface 340 communicates with one or more remote devices. To communicate with remote devices, communication interface 340 may include, for example, a wired network adapter, a wireless network adapter, and/or a mobile telecommunications adapter.

Figure 4:
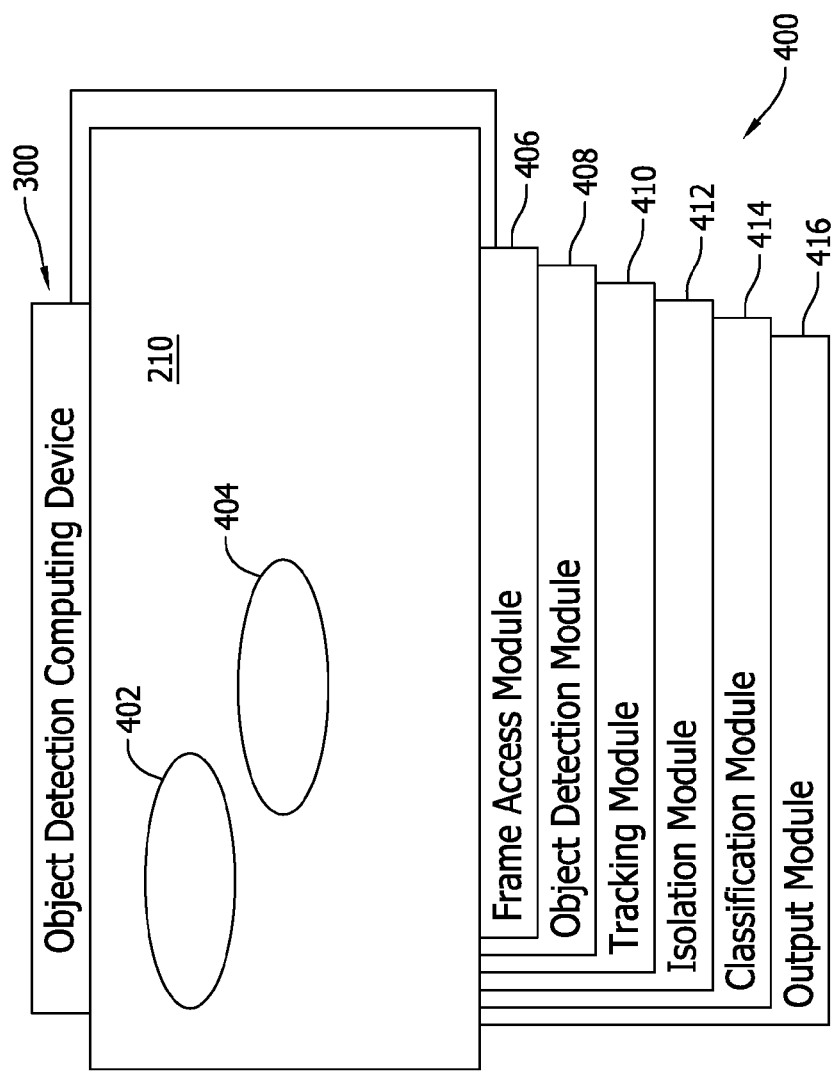
FIG. 4 is a diagram of modules of the object classification computing device shown in FIG. 3 that may be used to implement the system shown in FIG. 2.

FIG. 4. is a diagram 400 of exemplary modules of object classification computing device 300. Further, FIG. 4 shows that memory device 210 may store, for example, a video frame 402 and a segment 404 of video frame 402.

As shown in FIG. 4, object classification computing device 300 includes a frame access module 406 for accessing video frame 402 of a video, video frame 402 including at least one object of interest to be classified. Object classification computing device 300 further includes an object detection module 408 for performing object detection on video frame 402 to detect an object of interest. A tracking module 410 tracks the object of interest over a plurality of frames in the video over time using a persistent tracking capability, and an isolation module 412 isolates segment 404 of video frame 402 that includes the object of interest. Object classification computing device 300 further includes a classification module 414 that classifies the object of interest by processing segment 404 using deep learning (e.g., a neural network), and an output module 416 generates an output that indicates the classification of the object of interest.

Figure 5:
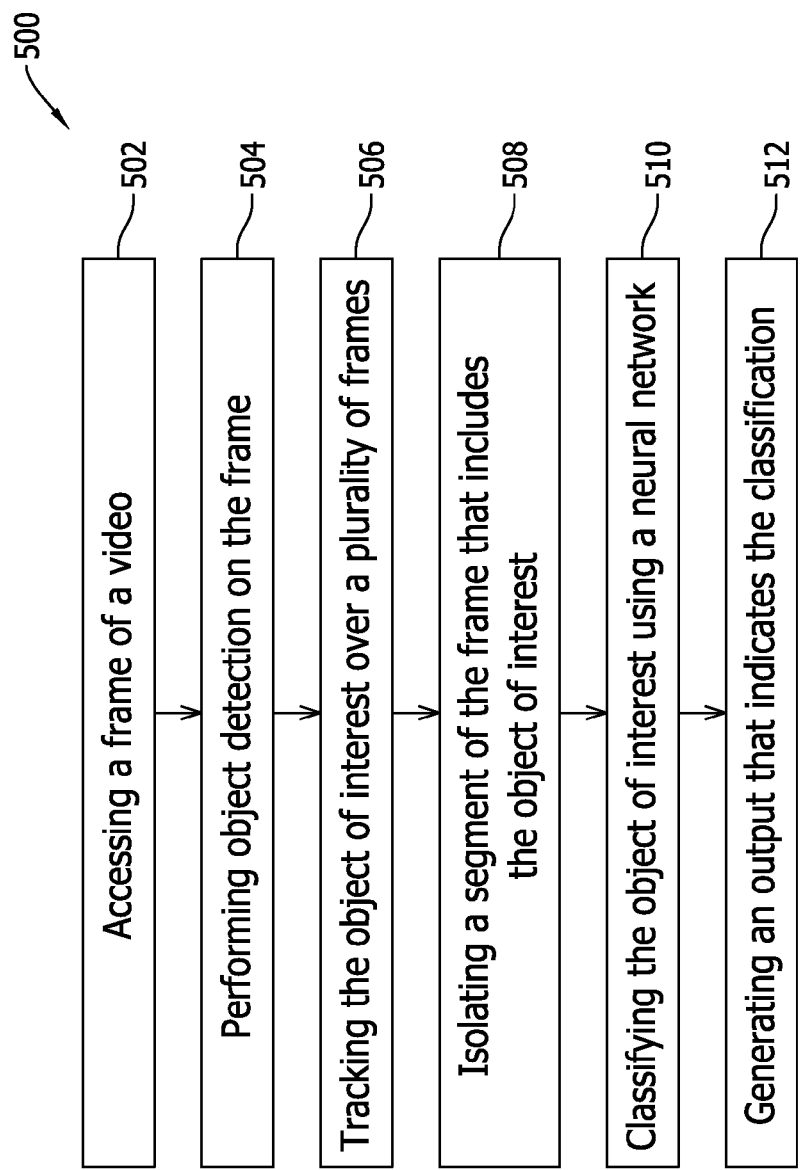
FIG. 5 is a flowchart of an exemplary object classification method that may be performed using the object classification computing device shown in FIGS. 3 and 4.

FIG. 5 is a flowchart of an exemplary object classification method 500 that may be performed using object classification computing device 300 (shown in FIGS. 3 and 4). Method 500 includes accessing 502 a frame of a video, the frame including at least one object of interest to be classified, performing 504 object detection on the frame to detect the object of interest, and tracking 506 the object of interest over a plurality of frames in the video over time using a persistent tracking capability. Method 500 further includes isolating 508 a segment of the frame that includes the object of interest, 510 classifying the object of interest by processing the segment using deep learning (e.g., using a neural network), and 512 generating an output that indicates the classification of the object of interest.

Notably, the systems and methods described herein may be used for automatic target recognition (ATR). For example, for a search and rescue mission for a missing person in an urban area, the systems described herein may be configured to detect a certain vehicle (e.g., a "red pickup truck") and configured to alert a user only when that category of identification is made on an object. The system can then be used to scan an area (e.g., possible roads) to detect/track/identify objects in the scene, thus alerting if and only if the desired object is found. This avoids requiring a human operator to watch a video monitor for possible "red pickup trucks", because the automated system will automatically alert when the desired object is found, excluding other possible objects that are not desired.

In another example, the systems and methods described herein may be used to conduct a search and rescue for a missing person in rural area. In this example, assume information indicates the person was last seen in a blue sedan vehicle but may have left the vehicle and be on-foot. The system can thus be configured to alert only when the category of "person" or "blue sedan" is detected, such that the system scans the area appropriately (e.g., as part of a manned or unmanned aircraft system searching the area). The system, using detect/track & identify capabilities, will alert if and only if the candidate "person" or "blue sedan" is identified in the visual scene. By nature of the identification capabilities, other detections such as wildlife and vehicles of different configurations/colors (other than the type desired) will not trigger an alert. Thus, a human operator does not need to dedicate his or her attention to viewing a video screen, and their attention can be focused elsewhere until the system alerts to a detection.

Further, due do advances in embedded computing processors, the algorithms and systems described herein may implemented on a small weight and power (SWAP) platform system-on-a-chip. That is, the computing hardware needed to run the algorithms described herein may have operate in a relatively small footprint/small platform environment. For example, the systems and methods may be implemented in a power envelope of approximately 10 to 30 watts, and are therefore suitable for on-board use on unmanned vehicles, intelligence and surveillance systems, armaments, etc. At least some known systems are unable to perform object detecting, tracking, and classifying under SWAP constraints.

Further, unlike at least some known systems, the systems and methods described herein operate on video data in real-time (e.g., a scene from a video camera where each image represents an increment in time from the previous image); whereas known systems use a batch-process collection of unrelated still images and there is no concept of "real time" operation since it is not required to process a video feed. Moreover, the systems and methods described herein may be implemented using a GPGPU, which allows achieving relatively high performance in a relatively small package (i.e., small SWAP).

Notably, the systems and methods described herein involve detection from subsequent frames, tracking amongst subsequent frames, and identifying an object via a deep learning system. These methods are mathematically intensive to the point that these methods cannot practically be performed by a human at a speed necessary for real-time tracking.

The systems and methods described herein facilitate detecting, tracking, and classifying objects of interest in a video. From a frame of video, a tracking component detects and tracks one or more objects of interest. Segments containing the objects of interest are transmitted to a classification component. The classification component uses deep learning to classify (i.e., identify) the object of interest. By classifying the object based on only a segment of the frame, the computational requirements needed to classify the object are significantly reduced.

Technical effects of the systems and methods described herein include at least one of i) accessing a frame of a video, the frame including at least one object of interest to be classified; ii) performing object detection on the frame to detect the object of interest; iii) tracking the object of interest over a plurality of frames in the video over time using a persistent tracking capability; iv) isolating a segment of the frame that includes the object of interest; v) classifying the object of interest by processing the segment using deep learning; and vi) generating an output that indicates the classification of the object of interest.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of classifying at least one object of interest in a video, the method comprising:
   accessing, using at least one processing device, a frame of the video, the frame including at least one object of interest to be classified;
   performing, using the at least one processing device, object detection on the frame to detect the object of interest;
   tracking, using the at least one processing device, the object of interest over a plurality of frames in the video over time using a persistent tracking capability;
   isolating, using the at least one processing device, a segment of the frame that includes the object of interest;
   classifying, using the at least one processing device, the object of interest tracked in the tracking step, by processing the segment using deep learning;
   generating an output that indicates the classification of the object of interest; and
   continuing to track, using the classification of the object of interest, the object of interest after the object of interest has left and returned to a field of view of the video.

2. A method in accordance with claim 1, wherein tracking the object of interest comprising tracking the object of interest using a tracking component, and wherein classifying the object of interest comprises classifying the object of interest using a classification component, wherein the classification component is located remotely from the tracking component.

3. A method in accordance with claim 2, wherein classifying the object of interest using a classification component comprises classifying the object of interest using a classification component of at least one processing device installed on a vehicle.

4. A method in accordance with claim 2, wherein classifying the object of interest using a classification component comprises classifying the object of interest using a classification component that satisfies small size, weight, and power requirements.

5. A method in accordance with claim 1, wherein classifying the object of interest by processing the segment using deep learning comprises classifying the object of interest by processing the segment using at least one of a convolutional neural network and a deep neural network.

6. A method in accordance with claim 1, wherein isolating a segment of the frame that includes the object of interest comprises isolating the segment such that the object of interest is substantially centered within the segment.

7. A method in accordance with claim 1, wherein generating an output comprises:
   receiving, from a user at an input device coupled to the at least one processor, a predetermined object type; and
   generating, using a presentation interface coupled to the at least one processor, an alert when the classification of the object of interest matches the predetermined object type.

8. A method in accordance with claim 1, further comprising tracking, using the at least one processing device, an object of interest that has been classified in the classifying step, over a plurality of frames in the video over time using the persistent tracking capability.

9. A computer-implemented system operative to classify at least one object of interest in a video, the system comprising:
   a tracking component implemented using at least one processing device and configured to:
      access a frame of the video, the frame including at least one object of interest to be classified;
      perform object detection on the frame to detect the object of interest;
      track the object of interest over a plurality of frames in the video over time using a persistent tracking capability;
      isolate a segment of the frame that includes the object of interest; and continue to track, using a classification of the object of interest, the object of interest after the object of interest has left and returned to a field of view of the video; and a classification component communicatively coupled to said tracking component, said classification component implemented using the at least one processing device and configured to:

classify the object of interest tracked by the tracking component, by processing the segment using deep learning; and generate an output that indicates the classification of the object of interest.

10. A system in accordance with claim 9, wherein said classification component and said tracking component are implemented using a single processing device.

11. A system in accordance with claim 9, wherein said classification component is located remotely from said tracking component.

12. A system in accordance with claim 11, wherein said classification component is implemented using at least one processing device installed on a vehicle.

13. A system in accordance with claim 11, wherein said classification component satisfies small size, weight, and power requirements.

14. A system in accordance with claim 9, wherein to classify the object of interest by processing the segment using deep learning, said classification component is configured to classify the object of interest using at least one of a convolutional neural network and a deep neural network.

15. A system in accordance with claim 9, wherein to isolate a segment of the frame that includes the object of interest, said tracking component is configured to isolate the segment such that the object of interest is substantially centered within the segment.

16. A system in accordance with claim 9, wherein the tracking component is further configured to track an object of interest that has been classified by the classifying component, over a plurality of frames in the video over time using the persistent tracking capability.

17. An object classification computing device operative to classify at least one object of interest in a video, the object classification computing device comprising:

one or more memory devices; and one or more processors communicatively coupled to said one or more memory devices, said one or more processors configured to:

access a frame of the video, the frame including at least one object of interest to be classified;

perform object detection on the frame to detect the object of interest;

track the object of interest over a plurality of frames in the video over time using a persistent tracking capability;

isolate a segment of the frame that includes the object of interest;

classify the object of interest tracked by the processor, by processing the segment using deep learning;

generate an output that indicates the classification of the object of interest; and continue to track, using a classification of the object of interest, the object of interest after the object of interest has left and returned to a field of view of the video.

18. An object classification computing device in accordance with claim 17, wherein at least one of said processors is installed on a vehicle.

19. An object classification computing device in accordance with claim 17, wherein at least one of said processors satisfies small size, weight, and power requirements.

20. An object classification computing device in accordance with claim 17, wherein to classify the object of interest by processing the segment using deep learning, at least one of said processors is configured to classify the object of interest using a convolutional neural network.

21. An object classification computing device in accordance with claim 17, wherein at least one of said processors is further configured to track an object of interest that has been classified by the one or more processors, over a plurality of frames in the video over time using a persistent tracking capability.

* * * * *